(12) United States Patent
Nakano

(10) Patent No.: US 6,861,467 B2
(45) Date of Patent: Mar. 1, 2005

(54) POWDER COATING COMPOSITION

(75) Inventor: Hiroshi Nakano, Nabari (JP)

(73) Assignee: Okitsumo Incorporated, Nabari (JP)

( * ) Notice: Subject to any disclaimer, the term of this patent is extended or adjusted under 35 U.S.C. 154(b) by 0 days.

(21) Appl. No.: 10/606,017

(22) Filed: Jun. 25, 2003

(65) Prior Publication Data

US 2004/0102561 A1 May 27, 2004

(30) Foreign Application Priority Data

Jun. 28, 2002 (JP) ........................................ 2002-189519

(51) Int. Cl.⁷ .............................................. C08L 83/04
(52) U.S. Cl. ........................ 524/588; 525/474; 524/449; 524/437; 524/413
(58) Field of Search ................................ 524/588, 449, 524/437, 413; 525/474

(56) References Cited

U.S. PATENT DOCUMENTS

| | | | | |
|---|---|---|---|---|
| 4,879,344 A | * | 11/1989 | Woo et al. ................... | 525/100 |
| 4,910,086 A | * | 3/1990 | Kawakami et al. .......... | 428/419 |
| 5,905,104 A | * | 5/1999 | Eklund et al. ............... | 523/435 |

* cited by examiner

*Primary Examiner*—Kuo-Liang Peng
(74) *Attorney, Agent, or Firm*—Baker & Daniels

(57) ABSTRACT

A powder coating composition contains a binder component of either a silicone resin or a mixture of a silicone resin and at least one selected from the group consisting of an epoxy resin, a phenolic resin, an acrylic resin, a polyester resin, and a fluororesin; and a reinforcing pigment of at least one of a mica and a whisker, wherein the content of the silicone resin in the binder component is at least 60% by weight. Such a composition can be free from the occurrence of the paint film cracks and peeling under heat at a high temperature of 300° C. or higher and can have good heat-resistant adhesion. Therefore, the present invention provides a powder coating composition which is excellent in heat-resistant adhesion at a high temperature of 300° C.

3 Claims, No Drawings

POWDER COATING COMPOSITION

BACKGROUND OF THE INVENTION

1. Field of the Invention

The present invention relates to a powder coating composition that can provide good heat-resistant adhesion at a high temperature of 300° C. or higher.

2. Description of the Related Art

The powder coating material is generally composed of a resin, a pigment, a curing agent, an additive, and the like. The conventional powder coating material, whose binder component is an epoxy resin, a polyester resin, an acrylic resin, or the like, has a problem with the post-heating performance. Specifically, the paint film of such a material can develop cracks and/or peeling at a temperature from 200° C. to 300° C. and therefore is problematic in the heat-resistant adhesion to the object at high temperature.

SUMMARY OF THE INVENTION

The inventor has made active investigations on the powder coating composition to solve the above-mentioned problem and finally found a powder coating composition that can be free from the occurrence of the paint film cracks and/or peeling under heat at a high temperature of 300° C. or higher and completed the present invention.

The present invention is directed to a powder coating composition, comprising: a binder component of either a silicone resin or a mixture of a silicone resin and at least one selected from the group consisting of an epoxy resin, a phenolic resin, an acrylic resin, a polyester resin, and a fluororesin; and a reinforcing pigment of at least one of a mica and a whisker, wherein the content of the silicone resin in the binder resin is at least 60% by weight. Such a composition can provide good heat-resistant adhesion to the object at high temperature.

DETAILED DESCRIPTION OF THE PREFERRED EMBODIMENTS

The powder coating composition of the present invention essentially contains a silicone resin as the binder component. In the present invention, the silicone resin is preferably in a solid state at 50° C. so that the powder coating material can be free from blocking during storage. Additionally, the hydroxyl group content in the silicone resin is preferably 2 to 7% by weight, more preferably 3 to 5% by weight based on the total weight of the silicone resin so that the paint film can be cured in a general painting line.

In the present invention, a mixture of a silicone resin and at least one selected from the group consisting of an epoxy resin, a phenolic resin, an acrylic resin, a polyester resin, and a fluororesin is alternatively used as the binder component.

In the present invention, any epoxy resin that has been used for conventional powder coating materials can be used without limit, for example, including a bisphenol type epoxy resin, a novolak type epoxy resin, and an alicyclic type epoxy resin.

In the present invention, any phenolic resin that has been used for conventional powder coating materials can be used without limit, for example, including a phenol-novolak resin, a phenol modified xylene resin, an alkyl phenol resin, a melamine-phenol resin, and a polybutadiene modified phenol resin.

In the present invention, any acrylic resin that has been used for conventional powder coating materials can be used without limit, for example, including resins obtained by general polymerization or copolymerization processes of a monomer such as methyl acrylate, ethyl acrylate, n-butyl acrylate, methyl methacrylate, ethyl methacrylate, n-butyl methacrylate, and styrene.

In the present invention, any polyester resin that has been used for conventional powder coating materials can be used without limit, for example, including resins formed by general processes of the reaction of a carboxylic acid such as terephthalic acid, isophthalic acid, phthalic acid, and succinic acid with a polyhydric alcohol such as ethylene glycol, propanediol, butanediol, hexanediglycol, and pentaerythritol.

In the present invention, any fluororesin that has been used for conventional powder coating materials can be used without limit, for example, including a polytetrafluoroethylene resin and a polychloro-trifluoroethylene resin.

The powder coating composition of the present invention essentially contains at least one of the mica and the whisker as the reinforcing pigment. If the reinforcing pigment is omitted from the composition, the paint film of such are inforcing pigment-free composition can less absorb the shrinkage stress in the cooling process after heat treatment. Such a shrinkage stress is caused by the difference in the coefficient of thermal expansion between the base material and the paint film. Specifically, the paint film of such a reinforcing pigment-free composition can peel off the object after heating at 500° C. for 48 hours. Any mica that has been used for conventional powder coating materials can be used without limit. Preferred examples of the whisker include a potassium titanate whisker, an aluminum borate whisker, a silicon carbide whisker, a silicon nitride whisker, a calcium carbonate whisker, a basic magnesium sulfate whisker, and a zinc oxide whisker. The potassium titanate whisker and the aluminum borate whisker are more preferred in view of the dispersibility into the binder resin, the paint film smoothness, and the low cost.

Among the above-described binder components, the silicone resin, whose skeleton is formed of a siloxane bond (—O—Si—O—), can maintain its binder characteristics after heating. In contrast, the other non-silicone resins can undergo the decomposition of the skeleton in the heating process at high temperature to lose their binder characteristics. Specifically, if the content of the silicone resin in the binder component is less than 60% by weight, the paint film of the powder coating material would peel off the object after heating at 500° C. for 48 hours. In view of the heat-resistant adhesion, therefore, the content of the silicone resin in the binder component is essentially 60% by weight or more, preferably 65% by weight or more.

If the content of the binder component in the powder coating composition of the present invention is more than 50% by weight, the powder coating material can form a pigment-free clear layer in the paint film surface and therefore the paint film can tend to develop cracks after heating at 500° C. for 48 hours. In view of the heat-resistant adhesion, therefore, the content of the binder component in the powder coating composition is preferably 50% by weight or less, more preferably 45% by weight or less.

Besides the silicone resin, the epoxy resin, and the like, another resin such as a vinyl resin and a melamine resin and the like may be added to the powder coating composition of the present invention, as far as the characteristics according to the present invention is not impaired. In addition, a color pigment such as metal powder including aluminum pigment powder, stainless steel powder, bronze powder, and copper powder; and a metal oxide including titanium oxide, chromium oxide, cobalt blue, and red iron oxide may be added to form a color powder coating composition.

The powder coating composition of the present invention preferably includes at least one pigment for providing corrosion resistance selected from zinc dust, aluminum phosphate, zinc strontium phosphite, zinc borate, and zinc potassium molybdate. In addition, any other material which has been used for conventional powder coating materials, such as a pigment including barium sulfate and talc; and another additive including a surface regulator, a curing agent, and an antifoamer may appropriately be added depending on the purpose of use.

In order to prepare the powder coating material of the present invention, first, the materials are homogeneously pre-mixed with each other by means of a Henschel mixer, a ball mill, or the like. With heating, the mixture is melted and kneaded with an extruder or a hot roller. The mixture is then pulverized with an atomizer, a jet mill, or the like, and the coarse particles and the too fine particles are removed with a cyclone classifier. The powder coating composition of the present invention is preferably 15 to 25 $\mu$m in average particle diameter. In a painting process, the powder coating material is dispersed onto the surface of the object and heated to form a paint film. Examples of the painting technique include flame spraying, fluidized-bed coating, electrostatic fluidized-bed coating, and electrostatic powder spraying. After painting, baking are carried out preferably at a temperature of 180° C. to 250° C. for 60 minutes to 20 minutes. The powder coating material of the present invention preferably provides a paint film thickness of 10 to 80 $\mu$m, more preferably 20 to 50 $\mu$m.

EXAMPLES

The present invention is described below in more detail with reference to Examples, Comparative Examples, and Reference Examples, but such Examples are not intended to be limiting upon the scope of the invention. Examples 1 to 6, Comparative Examples 1 and 2, and Reference Examples 1 and 2

The materials used include a silicone resin: DC249 (Dow Corning Corporation), an epoxy resin: 180S70 (Japan Epoxy Resins Co., Ltd.), flow agent: BYK364P (BYK-Chemie GmbH), degassing agent: Benzoin (Midori Kagaku Co., Ltd.), a mica: Takara Mica M-101 (Shiraishi Calcium Kaisha Ltd.), potassium titanate: TISMO D (Otsuka Chemical Co., Ltd.), aluminum borate: ALBOREX Y (Shikoku Chemicals Corp.), barium sulfate: Barium Sulfate BA (SAKAI CHEMICAL INDUSTRY CO., LTD.), a black color pigment: Bayferrox303T (Bayer AG), and zinc dust: F-500 (The Honjo Chemical Corporation). The materials were homogeneously mixed at each composition ratio as shown in Table 1 by using a Henschel mixer. With heating at 90° C., the mixture was melted and kneaded with a biaxial extruder and pulverized with a Bantam mill. A Ro-Tap type classifier was then used to cut off coarse particles of 280 or less in mesh size, so that a powder coating material with an average particle diameter of 25 $\mu$m was obtained.

An SPC steel plate (Taiyu Kizai Co. Ltd) was pre-treated by sandblasting with blasting powder of Alundum 80 to form a test piece for use. The powder coating material was applied onto the test piece with a thickness of 25 to 40 $\mu$m by using a corona discharge type electrostatic powder-coating machine, and then baked at 230° C. for 30 minutes in a hot-air drying furnace to form a paint film, and finally a painted plate was obtained.

The resulting painted plate was evaluated by the following tests.

(1) Initial Adhesion Test

After the baking, across-cut adhesion test by tape peeling was carried out according to JIS K5600-5-6 for adhesive property (a cross-cut method), and then the state of the paint film was observed based on the following criteria:

◯: Neither Cracking nor Peeling
Δ: Cracking
X: Peeling (2) Impact Test

According to JIS K5600-5-3 for resistance to weight drop, a Du Pont type ball impact test was carried out with a punch diameter of ½ inch, a weight of 300 g, and a height of 30 cm, and then the state of the paint film was observed based on the following criteria:

◯: Neither Cracking nor Peeling
Δ: Cracking
X: Peeling (3) Solvent Resistance Test Ethanol rubbing was carried out ten times, and then the state of the paint film was observed based on the following criteria:

◯: Neither Softening nor Reduction in Gloss
X: Softening and Reduction in Gloss (4) Heat-Resistant Adhesion Test After heating at 500° C. for 48 hours, a cross-cut adhesion test by tape peeling was carried out according to JIS K5600-5-6 for adhesive property (a cross-cut method), and then the state of the paint film was observed based on the following criteria:

◯: Neither Cracking nor Peeling
Δ: Cracking
X: Peeling (5) Corrosion Resistance Test According to JIS K5600-7-1 for resistance to neutral brine spray, a scratch mark was made on the painted plate, and a 96-hour spray test was carried out, and then the state of the paint film was observed based on the following criteria:

◯: Neither Rusting nor Peeling Beyond the 3-mm-Wide Portion on Either Side of the Scratch Mark
X: Rusting or Peeling Beyond the 3-mm-Wide Portion on Either Side of the Scratch Mark

TABLE 1

|  |  | Examples | | | | | | Comparative Examples | | Reference Examples | |
|---|---|---|---|---|---|---|---|---|---|---|---|
|  |  | 1 | 2 | 3 | 4 | 5 | 6 | 1 | 2 | 1 | 2 |
| Materials | Silicone Resin | 45 | 40 | 30 | 30 | 30 | 30 | 15 | 30 | 45 | 30 |
|  | Epoxy Resin | 0 | 5 | 15 | 15 | 15 | 15 | 30 | 15 | 15 | 15 |
|  | Flow Agent | 2.5 | 2.5 | 2.5 | 2.5 | 2.5 | 2.5 | 2.5 | 2.5 | 2.5 | 2.5 |
|  | Degassing Agent | 0.5 | 0.5 | 0.5 | 0.5 | 0.5 | 0.5 | 0.5 | 0.5 | 0.5 | 0.5 |
|  | Mica | 20 | 20 | 20 | 10 | 5 | 5 | 20 | 0 | 14 | 20 |
|  | Potassium Titanate | 0 | 0 | 0 | 0 | 15 | 0 | 0 | 0 | 0 | 0 |
|  | Aluminum Borate | 0 | 0 | 0 | 0 | 0 | 15 | 0 | 0 | 0 | 0 |
|  | Barium Sulfate | 0 | 0 | 0 | 10 | 0 | 0 | 0 | 20 | 0 | 12 |
|  | Black Color Pigment | 20 | 20 | 20 | 20 | 20 | 20 | 20 | 20 | 14 | 20 |

TABLE 1-continued

| | | Examples | | | | | | Comparative Examples | | Reference Examples | |
|---|---|---|---|---|---|---|---|---|---|---|---|
| | | 1 | 2 | 3 | 4 | 5 | 6 | 1 | 2 | 1 | 2 |
| | Zinc Dust | 12 | 12 | 12 | 12 | 12 | 12 | 12 | 12 | 9 | 0 |
| Evaluation | Initial Adhesion | ○ | ○ | ○ | ○ | ○ | ○ | ○ | ○ | ○ | ○ |
| | Impact | ○ | ○ | ○ | ○ | ○ | ○ | ○ | ○ | ○ | ○ |
| | Solvent Resistance | ○ | ○ | ○ | ○ | ○ | ○ | ○ | ○ | ○ | ○ |
| | Heat-Resistant Adhesion | ○ | ○ | ○ | ○ | ○ | ○ | X | X | △ | ○ |
| | Corrosion Resistance | ○ | ○ | ○ | ○ | ○ | ○ | ○ | ○ | ○ | X |

The present invention is directed to a powder coating composition, comprising: a binder component of either a silicone resin or a mixture of a silicone resin and at least one selected from the group consisting of an epoxy resin, a phenolic resin, an acrylic resin, a polyester resin, and a fluororesin; and a reinforcing pigment of at least one of a mica and a whisker, wherein the content of the silicone resin in the binder component is at least 60% by weight. Such a composition can be free from the occurrence of the paint film cracks and/or peeling under heat at a high temperature of 300° C. or higher and can have good heat resistance and good adhesion.

What is claimed is:

1. A powder coating composition, comprising:

a binder component of either a silicone resin or a mixture of a silicone resin and at least one selected from the group consisting of an epoxy resin, a phenolic resin, an acrylic resin, a polyester resin, and a fluororesin; and a reinforcing pigment of at least one of a mica and a whisker, wherein the content of said silicone resin in said binder component is at least 60% by weight, said silicone resin is in a solid state at 50° C. and said silicone resin has a hydroxyl group content of 2 to 7% by weight based on the total weight of said silicone resin, and said whisker is a potassium titanate whisker and/or an aluminum borate whisker.

2. The powder coating composition according to claim 1, wherein the content of said binder component in said composition is at most 50% by weight.

3. A powder coating material, comprising the powder coating composition according to claim 1.

* * * * *